Oct. 30, 1962
M. U. BAGWELL
3,060,964
VALVE HAVING VENTED HOUSING
Filed Nov. 10, 1958
2 Sheets-Sheet 2
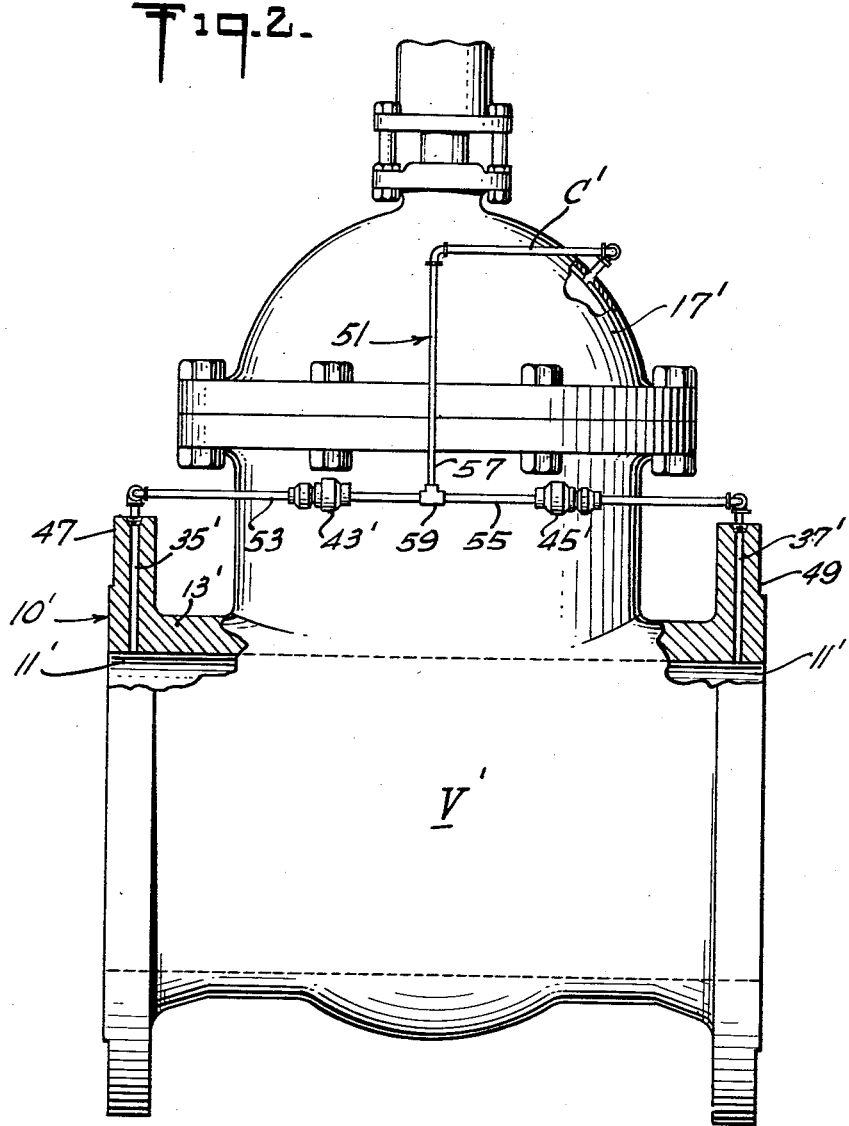
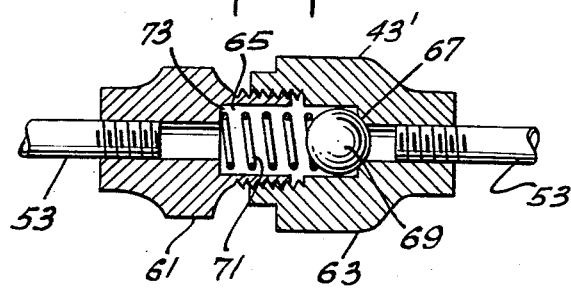

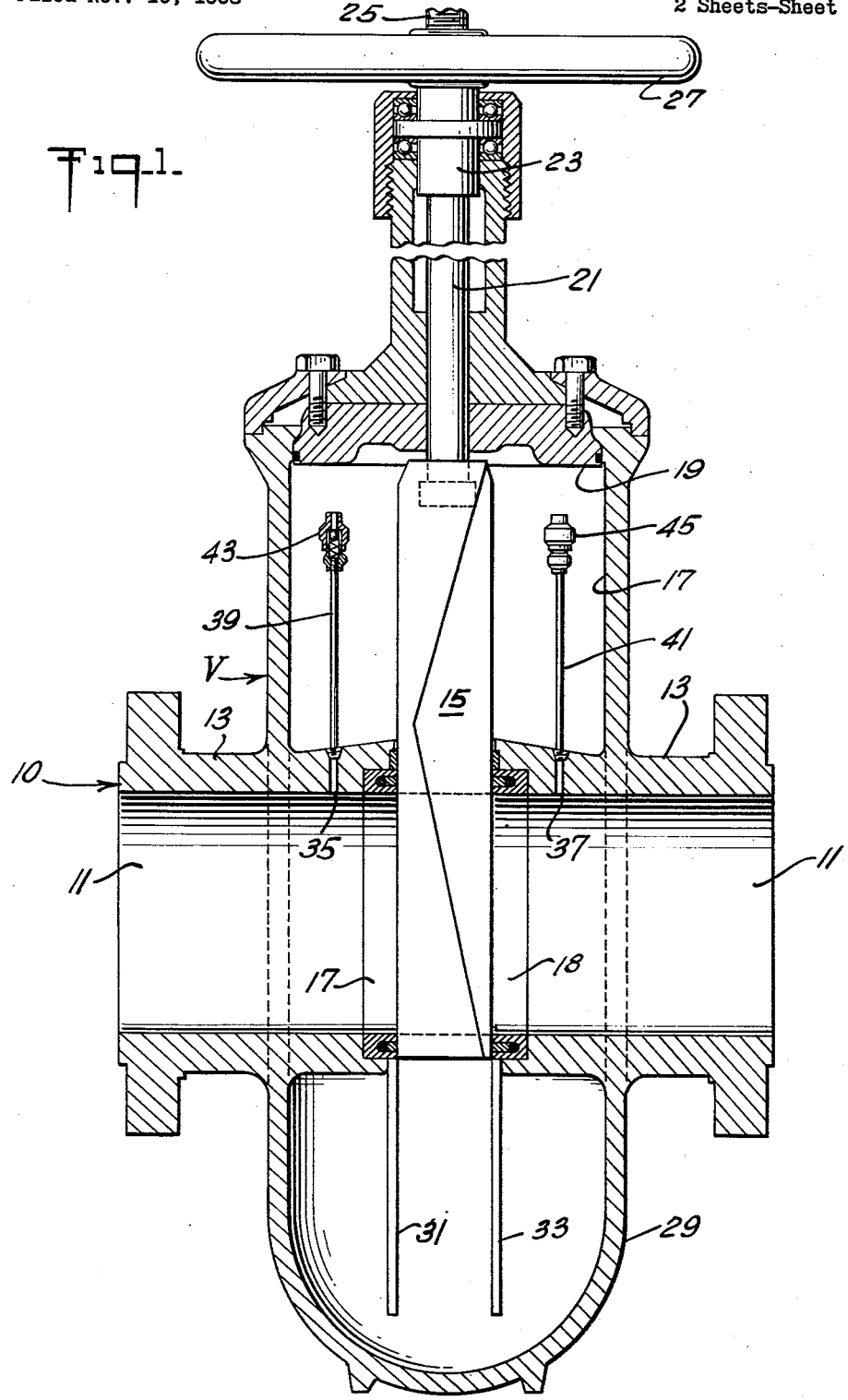

United States Patent Office 3,060,964
Patented Oct. 30, 1962

3,060,964
VALVE HAVING VENTED HOUSING
Marshall U. Bagwell, Houston, Tex., assignor to The Texas Pipe Line Company, Houston, Tex., a corporation of Texas
Filed Nov. 10, 1958, Ser. No. 772,925
1 Claim. (Cl. 137—599)

The present invention relates to an improved valve of the type having a hollow housing which encloses part of the valve actuating mechanism.

In the operation of pipelines conveying fluids such as natural gas or petroleum liquids bonneted gate valves are used to start or stop the flow of fluid. It has been found that fluid tends to leak from the valve passage and accumulate in the housing when the valve gate is open. Upon subsequent closing of the valve gate the fluid is trapped in the housing, wherein it may be heated by the sun. The resulting increased pressure due to expansion has often been great enough to rupture the housing.

In accordance with the present invention this difficulty is obviated by providing at least one vent conduit between the interior of the valve housing and the valve passage on at least the downstream low pressure side of the valve gate. A check valve in the vent conduit is designed to remain closed while the pressure in the housing is the same or lower then in the valve passage, but to open when the housing pressure rises significantly above the passage pressure.

Pipelines often are used reversibly, with fluid flowing in one direction for a period, and then in the opposite direction for another period. To take care of this situation, it has been found advantageous to vent the housing to both sides of the valve gate so that relief to the low pressure downstream side of the valve may be obtained regardless of the flow direction.

In the drawings: FIG. 1 is a vertical sectional view, parts being in elevation, through a gate valve embodying internally located housing vents;

FIG. 2 is a side elevational view, parts being in vertical section, of another type of gate valve embodying externally located vents; and FIG. 3 is a vertical sectional view on an enlarged scale of a check valve unit as used in the valves of both FIGS. 1 and 2.

Referring to FIG. 1, there is shown a gate valve V comprising a body 10 having a fluid passage 11 therethrough provided with openings at its opposite ends, and having a wall 13. A closure member 15 in the form of a conventional transversely movable gate is located between the ends of passage 11 and is movable in the passage into and out of position against two valve seats 17 and 18. Gate 15 extends transversely through an aperture in wall 13 to the outside of the valve body where it is enclosed within a hollow housing 17 projecting from body 10 and closed by a bonnet 19.

The closure member or gate 15, includes a stem 21 extending up through a sleeve 23 which is journalled for rotation. Internal threads in the sleeve cooperate with external threads 25 on the stem to lower or raise the gate when a hand wheel 27 rotates the sleeve.

Projecting from the opposite side of valve body 10 is a second housing 29 enclosing the lower gate guide 31 and 33. In conventional valves of this type the lower and upper housings are in communication with one another through an annulus cast integrally into the valve body and surrounding seats 17 and 18.

To relieve pressure from the inside of housings 17 and 29 a pair of radial bores 35 and 37 are formed through the wall 13 on both sides of the gate 15 within the housing. Short lengths of pipe 39 and 41 have their lower ends threaded into the bores and extend up into the housing to a position in the upper portion of the housing beneath the bonnet. Spring closed check valves 43 and 45 are threaded on the tops of the pipes to prevent the flow of fluid from the passage 11 through the pipes. When the valve gate 15 is closed, an excess of pressure in the housing 17 over the pressure in the passage 11 forces the check valves to open against their springs to vent the accumulated fluid to the passage 11. If high line pressure is maintained on one side of the gate 15, the pressure in the housing will relieve through only one of the check valves to the relatively low pressure downstream side of the valve. By providing vents to both sides of the gate, this action will occur regardless of which way the fluid flows, from left to right or vice versa. Normally venting occurs only through the pipe 39 or 41 which is on the downstream side of the gate, the other remaining closed owing to the action of the high line pressure on the check valve.

FIG. 2 shows a vent construction which is particularly useful for modifying existing gate valves. A valve V' has a hollow housing 17' projecting from a body 10' having a passage 11' controlled by a gate or closure member (not shown) between its ends. Two radial bores 35' and 37' are drilled through flanges 47 and 49 forming part of the passage wall 13' and located outside of housing 17'.

A pipe 51 on the outside of the housing comprises two branch pipes 53 and 55 having ends secured one in each of the bores 35' and 37', and a single pipe section 57 connected thereto by a T 59. Pipe section 57 extends upwardly and has its opposite end secured in a bore through the housing 17' so as to establish communication between the inside of the housing and the passage 11'.

Oppositely facing check valves 43' and 45' are interposed within the two branch conduits 53 and 55 to prevent flow of fluid therethrough from passage 11', while acting to vent fluid from housing 17' to the passage as described in connection with FIG. 1, regardless of which way fluid flows through passage 11'.

Referring to FIG. 3, the check valve unit of FIGS. 1 or 2 is seen to comprise two hollow body members 61 and 63 threaded together to provide a chamber 65 having a valve seat 67 at one end. A valve ball 69 is normally pressed against seat 67 by one end of a spring 71 which is captured within chamber 65 and bears at its opposite end against a shoulder 73.

Obviously, many other modifications and variations of the invention as hereinbefore set forth may be made without departing from the spirit and scope and only such limitations should be imposed as are indicated in the appended claim.

I claim:

In a valve comprising a fluid conduit having a wall with aperture means therein; valve seat means in said conduit; closure means coacting with said valve seat means to open and close said conduit, said closure means extending through said aperture means to the outside of said conduit; a hollow housing on the outside of said conduit enclosing said closure means and said aperture means; a bonnet on the top of said housing; the construction and arrangement being such that fluid may accumulate in said housing while said valve is open and fluid flows through said passage, and that fluid normally is trapped in said housing when said valve is closed thereafter; the improvement which comprises; two bores through the wall of said conduit on opposite sides of said valve seat means and located within the circumference of said housing; two individual tubes secured in said bores and projecting into the upper portion of said housing beneath said bonnet, said tubes establishing communication between the inside of said conduit and the inside of said housing; and two normally closed independent check valves on the upper ends of and controlling said tubes, said check valves acting to open when the pressure inside said housing exceeds the pressure in said conduit adjacent the respective bores to release fluid to said conduit.

References Cited in the file of this patent

UNITED STATES PATENTS

| | | |
|---|---|---|
| 1,411,608 | Dawson | Apr. 4, 1922 |
| 2,074,195 | Uphoff | Mar. 16, 1937 |
| 2,670,752 | Laurent | Mar. 2, 1954 |
| 2,726,672 | Doster | Dec. 13, 1955 |
| 2,837,308 | Shand | June 3, 1958 |